(12) United States Patent
Punniyamurthy et al.

(10) Patent No.: US 11,880,312 B2
(45) Date of Patent: Jan. 23, 2024

(54) DATA AS COMPUTE

(71) Applicant: Advanced Micro Devices, Inc., Santa Clara, CA (US)

(72) Inventors: Kishore Punniyamurthy, Austin, TX (US); SeyedMohammad SeyedzadehDelcheh, Bellevue, WA (US); Sergey Blagodurov, Bellevue, WA (US); Ganesh Dasika, Austin, TX (US); Jagadish B Kotra, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 114 days.

(21) Appl. No.: 17/539,189

(22) Filed: Nov. 30, 2021

(65) Prior Publication Data

US 2023/0169015 A1    Jun. 1, 2023

(51) Int. Cl.
*G06F 12/00* (2006.01)
*G06F 12/126* (2016.01)
*G06F 12/0855* (2016.01)

(52) U.S. Cl.
CPC ........ *G06F 12/126* (2013.01); *G06F 12/0859* (2013.01); *G06F 2212/1024* (2013.01); *G06F 2212/6042* (2013.01)

(58) Field of Classification Search
CPC ........... G06F 12/126; G06F 2212/6042; G06F 12/0859; G06F 12/0888; G06F 2212/1024; G06F 2212/507; G06F 12/0895; G06F 12/0811
See application file for complete search history.

(56) References Cited

U.S. PATENT DOCUMENTS

| 6,470,438 B1 | 10/2002 | McCormick, Jr. | |
| 2015/0095577 A1* | 4/2015 | Vijayrao | G06F 12/0842 |
| | | | 711/129 |
| 2022/0365921 A1* | 11/2022 | Scott | G06F 16/2365 |

OTHER PUBLICATIONS

Balle, J., Laparra, V., & Simoncelli, E. P. (2016). End-to-end optimized image compression. arXiv preprint arXiv:1611.01704.
Chen, X., Yang, L., Dick, R. P., Shang, L., & Lekatsas, H. (2009). C-pack: A high-performance microprocessor cache compression algorithm. IEEE transactions on very large scale integration (VLSI) systems, 18(8), 1196-1208.
Kim, J., Sullivan, M., Choukse, E., & Erez, M. (Jun. 2016). Bit-plane compression: Transforming data for better compression in many-core architectures. In 2016 ACM/IEEE 43rd Annual International Symposium on Computer Architecture (ISCA) (pp. 329-340). IEEE.
Panda, B., & Seznec, A. (Oct. 2016). Dictionary sharing: An efficient cache compression scheme for compressed caches. In 2016 49th Annual IEEE/ACM international symposium on microarchitecture (MICRO) (pp. 1-12). IEEE.

(Continued)

*Primary Examiner* — Arvind Talukdar
(74) *Attorney, Agent, or Firm* — FIG. 1 Patents

(57) ABSTRACT

A method includes storing a function representing a set of data elements stored in a backing memory and, in response to a first memory read request for a first data element of the set of data elements, calculating a function result representing the first data element based on the function.

20 Claims, 8 Drawing Sheets

(56) References Cited

OTHER PUBLICATIONS

Toderici, G., O'Malley, S. M., Hwang, S. J., Vincent, D., Minnen, D., Baluja, S., . . . & Sukthankar, R. (2015). Variable rate image compression with recurrent neural networks. arXiv preprint arXiv:1511.06085.
Yang, J., Zhang, Y., & Gupta, R. (Dec. 2000). Frequent value compression in data caches. In Proceedings of the 33rd annual ACM/IEEE international symposium on Microarchitecture (pp. 258-265).
Breslow, A. D., & Jayasena, N. S. (2020). Morton filters: fast, compressed sparse cuckoo filters. The VLDB Journal, 29(2-3), 731-754.
International Search Report and Written Opinion, Application No. PCT/US2022/041080 dated Nov. 17, 2022.
Kislal, O., Kandemir, M. T., & Kotra, J. (May 2016). Cache-aware approximate computing for decision tree learning. In 2016 IEEE International Parallel and Distributed Processing Symposium Workshops (IPDPSW) (pp. 1413-1422). IEEE.

* cited by examiner

|  | Slope(m) | | | |
|---|---|---|---|---|
| offset(b) | 0 | 1 | 2 | 3 |
| 0 | 0 | 0 | 0 | 1 |
| 1 | 0 | 0 | 4 | 0 |
| 2 | 0 | 1 | 0 | 0 |
| 3 | 2 | 3 | 1 | 1 | accumulator matrix *Accum[m][b]* 600

FIGURE 6

DATA AS COMPUTE

BACKGROUND

Modern computing systems have one or more central processing units (CPUs) that typically include and rely on multiple caches in a cache hierarchy to improve processor and memory performance. Compared to main memory, a cache is a smaller and faster memory device that stores data that is frequently accessed or expected to be used in the near future so that the data can be accessed with low latency. Such cache devices are often implemented in static random access memory (SRAM) and are typically located between a processing unit that issues memory requests and the main memory device.

Memory bandwidth is a critical resource in modern day systems (e.g., CPU, graphics processing unit (GPU) or heterogenous systems) and has a significant impact on performance for many high performance computing (HPC) and machine learning (ML) applications.

BRIEF DESCRIPTION OF THE DRAWINGS

The present disclosure is illustrated by way of example, and not by way of limitation, in the figures of the accompanying drawings.

FIG. 6 illustrates an accumulator matrix for determining degrees of correlation for multiple candidate functions, according to an implementation.

DETAILED DESCRIPTION

Figure 1:
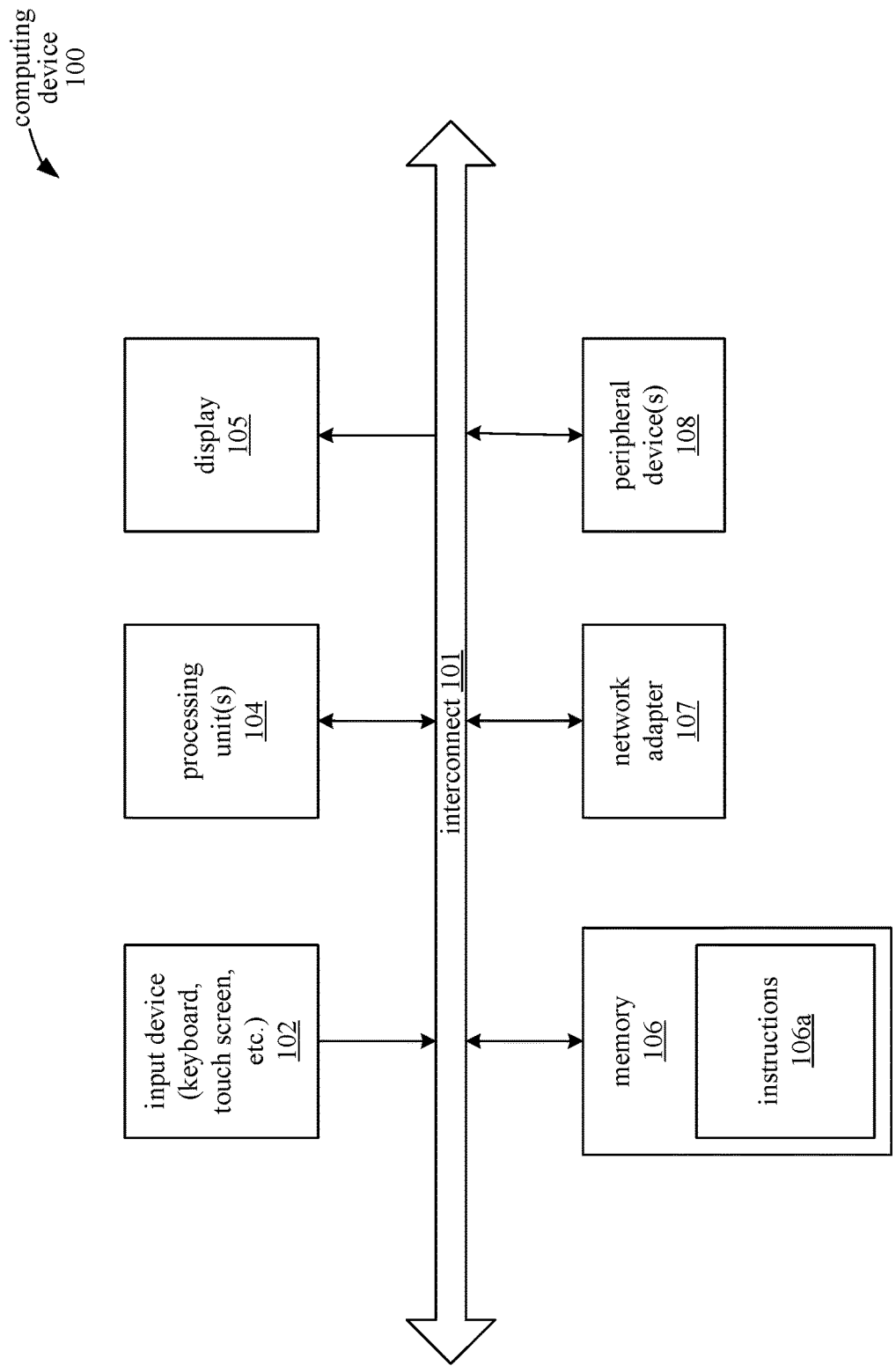
FIG. 1 illustrates an implementation of a computing device that includes a data as compute (DaC) cache.

The following description sets forth numerous specific details such as examples of specific systems, components, methods, and so forth, in order to provide a good understanding of the implementations. It will be apparent to one skilled in the art, however, that at least some implementations may be practiced without these specific details. In other instances, well-known components or methods are not described in detail or are presented in a simple block diagram format in order to avoid unnecessarily obscuring the implementations. Thus, the specific details set forth are merely exemplary. Particular implementations may vary from these exemplary details and still be contemplated to be within the scope of the implementations.

Growing demand for memory in computing systems to accommodate large datasets of HPC and ML applications has resulted in the emergence of tiered memory systems, such as Fabric-Attached Memory (FAM). While tiered memory structures can increase capacity in a computing system, tiered memory accesses have longer latency, lower bandwidth, and higher energy consumption. These issues can be addressed by exploiting locality, usually in some form of caching. However, benefits provided by data caching depend on the reuse distance and size of the working set. While many applications can benefit from data caching, data caching will not perform as well for large data sets with large reuse distance (e.g. loading a ML training data set across epochs). Cache compression techniques can be used to increase the effective capacity of a cache and thus reduce the number of memory accesses. However, the benefits of cache compression may not be sufficiently realized when the extended capacity cannot accommodate a large reuse distance. The disparity between processor and memory speed continues to grow and the resulting memory wall continues to be a major hurdle for improving performance.

One implementation of a computing system filters the number of memory accesses sent to remote or otherwise high-latency memory locations by representing the data as a function. A function $f(x)$ that can represent the data is derived using curve fitting techniques so a particular data element being requested can be obtained by computing $f(x)$ with a suitable input, such as an array index or address offset of the data element. Memory accesses for obtaining data are thus replaced with $f(x)$ computations, for which parameters representing $f(x)$ are stored and read from a faster local cache memory. This reduces the number of memory accesses to remote or high latency memory, resulting in lower bandwidth consumption, access latency (e.g by eliminating remote memory accesses) and higher performance.

It is often unlikely that a function can be derived that can fit all data points in a given memory range. Thus, in one implementation, $f(x)$ is used to provide data in a similar manner as a cache, in which an access is a hit if $f(x)$ can accurately (i.e., within a predetermined error tolerance) reconstruct the requested data element, and a miss otherwise. In this approach, the number of hits is not sensitive to the size of the working set or reuse distance, but instead depends on the data elements stored. This makes it suitable for caching large data sets (e.g data set for ML training across epochs, graph datasets for traversal, datasets stored in remote memory like FAM, etc.). A data-as-compute (DaC) cache that implements this approach can be placed in the memory hierarchy of a computing system to filter and reduce the memory accesses sent to remote or high-latency memory. In various implementations, the DaC cache can be positioned at the last-level cache in the memory hierarchy to filter memory access directed to main memory, or at the level of local dynamic random access memory (DRAM) to filter accesses directed to remote memory or storage.

FIG. 1 illustrates an implementation of a computing device 100 that includes a DaC cache. In general, the computing device 100 represents any of a number of different types of devices, including but not limited to a laptop or desktop computer, mobile phone, server, etc. The computing device 100 includes a number of components 102-108 that can communicate with each other through an interconnect 101. In computing device 100, each of the components 102-108 is capable of communicating with any of the other components 102-108 either directly through the interconnect 101, or via one or more of the other components 102-108. The components 101-108 in computing device 100 are contained within a single physical casing, such as a laptop or desktop chassis, or a mobile phone casing. In alternative implementations, some of the components of computing device 100 are embodied as peripheral devices such that the entire computing device 100 does not reside within a single physical casing.

The computing device 100 also includes user interface devices for receiving information from or providing information to a user. Specifically, the computing device 100 includes an input device 102, such as a keyboard, mouse, touch-screen, or other device for receiving information from the user. The computing device 100 displays information to the user via a display 105, such as a monitor, light-emitting diode (LED) display, liquid crystal display, or other output device.

Computing device 100 additionally includes a network adapter 107 for transmitting and receiving data over a wired or wireless network. Computing device 100 also includes one or more peripheral devices 108. The peripheral devices 108 include mass storage devices, location detection devices, sensors, input devices, or other types of devices that can be used by the computing device 100.

Computing device 100 includes one or more processing unit(s) 104 that receive and execute instructions 106a that are stored in the main memory 106. As referenced herein, each of the processing unit(s) 104 represents a processor "pipeline", and could include central processing unit (CPU) pipelines, graphics processing unit (GPU) pipelines, or other computing engines that support memory operations that use virtual addresses. Main memory 106 is part of a memory subsystem of the computing device 100 that includes memory devices used by the computing device 100, such as random-access memory (RAM) modules, read-only memory (ROM) modules, hard disks, and other non-transitory computer-readable media.

In addition to the main memory 106, the memory subsystem also includes cache memories, such as level 2 (L2) or level 3 (L3) caches, and/or registers. Such cache memory and registers are present in the processing unit(s) 104 or on other components of the computing device 100.

Figure 2:
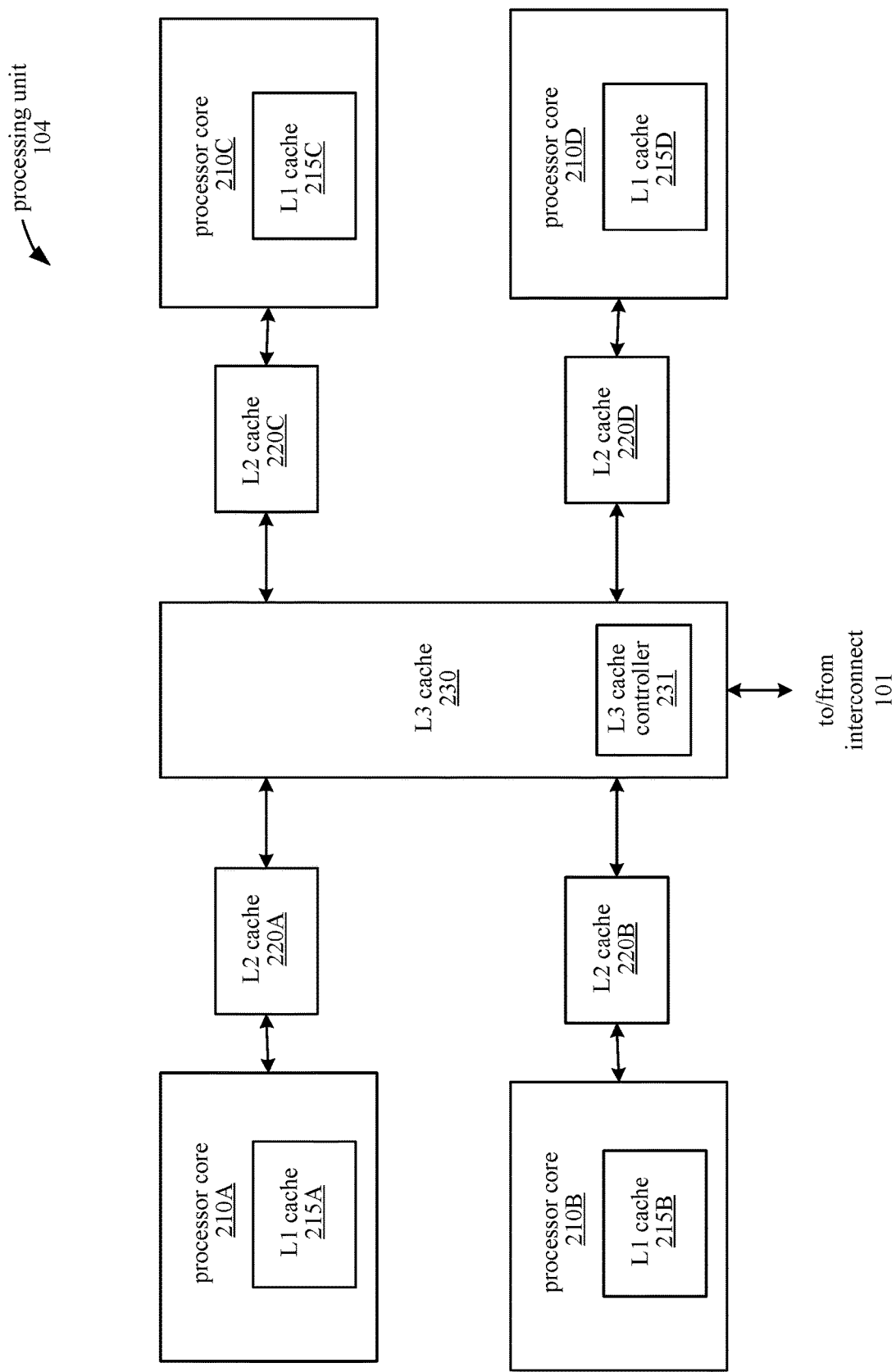
FIG. 2 illustrates processing cores and cache devices in a computing device, according to an implementation.

FIG. 2 illustrates components in a processing unit 104, according to an implementation. The processing unit 104 includes four processor cores 210A-D and a cache hierarchy subsystem including L1 caches 215A-D, L2 caches 220A-D, and an L3 cache 230 that is shared between the processor cores 210A-D. The cache subsystem includes high-speed cache memories (e.g., L1 cache 215A-D, L2 cache 220A-D, and an L3 cache 230) that store blocks of data (not shown). As used herein, a "block" is a set of bytes stored in contiguous memory locations within the cache memories, which are treated as a unit for coherency purposes. Additionally, each of the terms "cache block", "block", "cache line", and "line" is interchangeable herein. In some implementations, a block can also be the unit of allocation and deallocation in a cache. A block may be retrieved from other caches within the computing system 100, such as from other processing units or from the main memory.

The L3 cache 230 is shared by each of the processor cores 210A-D, such that data used in the execution of threads in any of the cores 210A-D can be cached in the L3 cache 230. L3 cache 230 is coupled to the interconnect 101 so the L3 cache can read and write from the main memory subsystem 106 and other devices (e.g., 102, 105, 107, 108) in the computing system. In other implementations, processing unit 104 may include fewer or more processor cores (e.g., processor core 210A) and corresponding L2 caches (e.g., L2 cache 220A). In yet other implementations, processing unit 104 may include other types of addressable cache subsystems that may include different numbers, types, and levels of cache memories.

Each of the cache devices 215A-D, 220A-D, and 230 includes a cache controller that intercepts read and write requests from the processor cores 210A-D that are directed to the main memory 106. Each cache controller then copies the data being accessed to its respective cache. When the cache controller adds new data to an already full cache, the cache controller selects a victim line to remove from the cache according to a replacement policy, which is a set of rules for identifying the least valuable data to keep in the cache (e.g., data that is least likely to be accessed again in the near future). In one implementation, the cache controller of a shared cache also monitors a number of metrics for each user of the shared cache, identifies similar users based on the monitored metrics, and groups the similar users together for the purpose of applying different policies to each group. In the processing unit 104, this functionality is implemented in the shared L3 cache controller 231 of the shared L3 cache 230.

Figure 3:
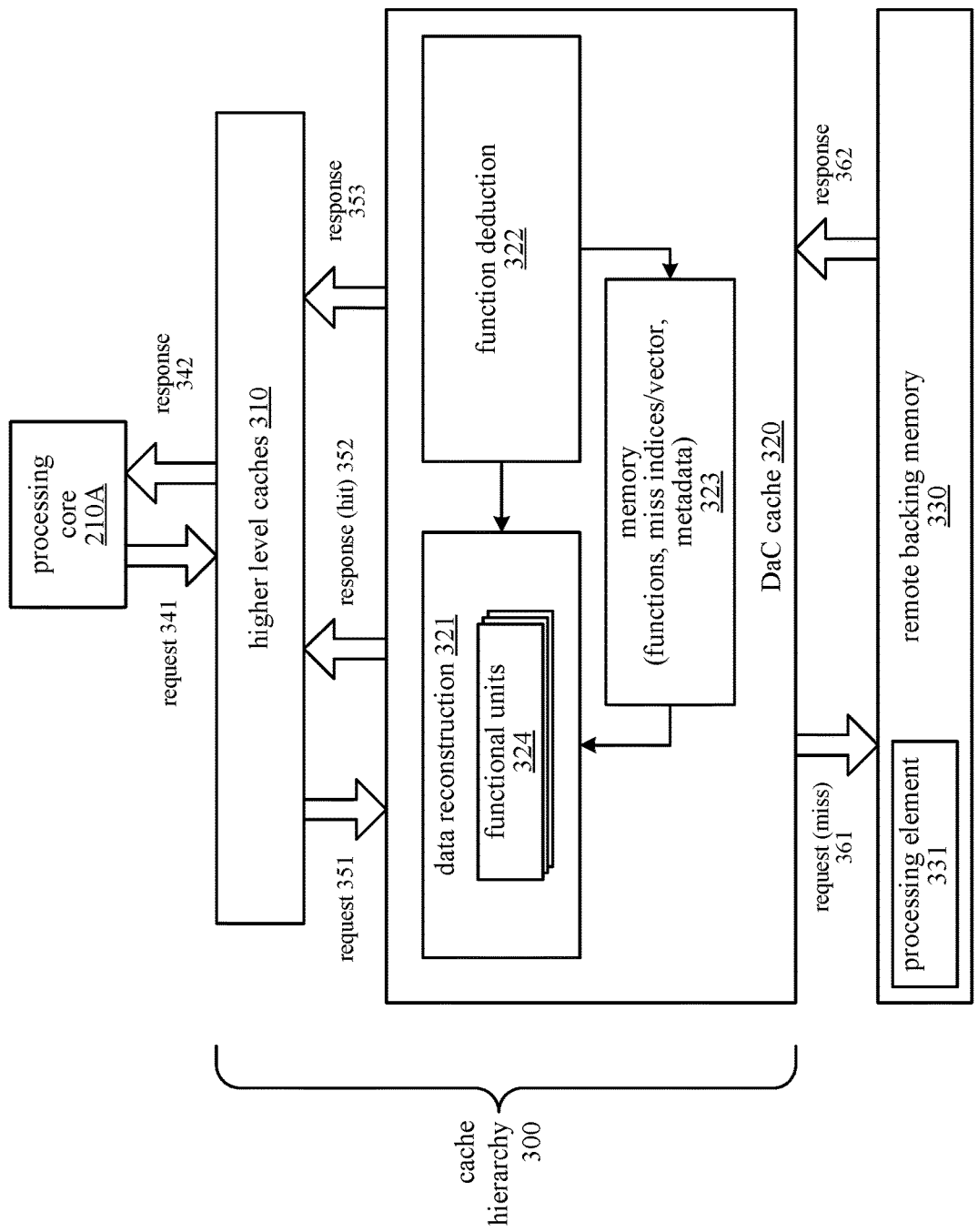
FIG. 3 illustrates an implementation of a DaC cache.

FIG. 3 illustrates an implementation of a memory hierarchy that includes a data-as-compute (DaC) cache 320 in the computing system 100. The processing core 210A is coupled with the memory hierarchy, which includes the cache hierarchy 300 and backing memory 330. As illustrated, the DaC cache 320 is positioned as a last-level cache in the cache hierarchy 300, between the higher-level caches 310 (e.g., L1 cache 215, L2 cache 220) and the backing memory 330, which represents one or more regions in the main memory 106, remote memory in another computing node, and/or other memory accessible to the computing system 100 that has higher latency and/or lower bandwidth than any of the cache memory in the cache hierarchy 300. Accordingly, the higher level caches 310 are positioned between the processing core 210A and the DaC cache 320 in the memory hierarchy. In alternative implementations, the processor core 210A may be another type of processing unit (e.g., CPU, GPU, or other processing unit or processing element).

When executing instructions for an application, the processing core 210A accesses data elements stored in the backing memory 330 by issuing memory read and write requests to the memory hierarchy. A data element is a piece of information that can be stored in memory, such as an integer value, floating point value, data structure, etc. Data elements that are requested by memory read requests are returned to the processing core 210A via responses issued by the devices in the memory hierarchy. As shown in FIG. 3, the processing core 210A requests one of a set of data elements stored in the backing memory 330 by issuing a request 341 to the memory hierarchy. If the requested data element is in the higher level caches 310, then the response 342 is provided from the caches 310. However, if the data element misses in the higher level caches 310, the higher level caches 310 request 351 the value from the DaC cache 320.

The DaC cache 320 represents the set of data elements in the backing memory 330 as a function. The function is recorded as a type of function (e.g., the degree of an n-degree polynomial function) and one or more function parameters (e.g., coefficients of the n-degree polynomial function), which are stored in a cache memory 323 in the DaC cache 320. For example, the function may be a quadratic curve for which three parameters (i.e., the three coefficients of the quadratic curve) are recorded in the memory 323, or the function may be a 14 parameter neural network (NN) based curves for which the 14 parameters are recorded in the memory 323.

In addition, metadata stored in the cache memory 323 associates the function with a memory address range (e.g., indicating start and end addresses) in the backing memory 330 that contains the set of data elements to be reconstructed by the function, and a set of miss indices associated with the function that indicates which of the data elements in the address range can be accurately (within a predetermined tolerance) reconstructed using the function. The set of miss indices includes an index identifying each data element in the associated memory address range that is not to be reconstructed by the function, since the function result is not within the predetermined tolerance of the data element. Alternatively, a set of hit indices can be used that stores the indices of data elements that can be reconstructed (within a predetermined tolerance) using the function.

Storing miss indices directly, where one miss index value corresponds to one data element, can scale with data size. In an alternative implementation, miss indices are maintained as bit vectors (e.g., a 128 byte miss vector for a window size of 1024 values) or Bloom filters with conservative hit prediction to limit the storage overhead. In alternative implementations, some of the metadata is embedded in other memory in the system, such as in the translation lookaside buffers (TLBs). For example, since every memory instruction consults the TLB, a miss vector embedded in TLB readily allows for curve fitting as soon as the address translation is done (e.g., after a miss in the L1 cache).

In one implementation, the DaC cache 320 tracks multiple memory regions by their address ranges, associating a function, miss indices (or miss vector), and metadata with each of the tracked memory regions. In one implementation, polynomial curve-fitting is used to fit quadratic curves accurately over datasets. Fitting a single quadratic curve over an entire large target memory region may result in a lower percentage of hits over the region, so larger regions are divided into smaller sub-regions with one or more curves fitted on each one. The entire large region is thus represented using multiple functions (e.g., up to 5 quadratic curves over different sub-regions of the larger region). The sub-region size (window size) can impact the accuracy of the fit. A smaller window size is more likely to result in a more accurate fit but will also result in higher parameter storage overhead across the entire target region, since more functions and their parameters are recorded. In one implementation, each single window or sub-region can have multiple functions fitted over it, where each function fitted is associated with its own corresponding miss vector or miss indices.

Depending on the position of DaC cache 320 in the hierarchy, the requests can be made with virtual or physical addresses. For virtual addresses, every memory region captured is additionally annotated with a process identifier to avoid address aliasing issues during context switching.

The data reconstruction logic 321 contains logic circuits for reconstructing requested data elements based on the function. When the DaC cache 320 receives the request 351 for a data element, the data reconstruction logic 321 determines whether the requested data element is within the address range associated with one of the tracked memory regions. If so, then the data reconstruction logic 321 also determines whether the miss indices for the memory region include the index associated with the requested data element. If the data element is not in the address range of a tracked memory region or its index is included in the miss indices, then the request 351 is treated as causing a miss in the DaC cache 320. Accordingly, a memory request 361 is sent to lower levels in the memory hierarchy (e.g., to the backing memory 330) to fetch the data element.

When the index corresponding to the data element is not in the miss indices, this indicates that the function can be used to reconstruct the data element, and the request 351 is treated as a hit. The function associated with the region containing the data element is then used to calculate a value to return to the processing core 210A. The input to the function depends on the type of function. For example, the function input can be an array index indicating a position of the data element in an array, a memory address offset, a prior or adjacent data element in an array, etc.

In one implementation, a function input ideally has a strong correlation with its corresponding data element and is readily available (e.g., is available at the time of the request). An offset or array index of a data element is a candidate which is readily derivable from the address of the requested data, but may not always have a strong correlation with the data elements. Alternatively, previous data elements can be used as input (e.g. time series data), which may have high correlation with the data elements but may not be readily available.

The data reconstruction logic 321 includes one or more functional units 324 containing dedicated logic circuits for calculating a function result based on the appropriate function input. When the function result is calculated, it is returned via response 352 to the higher level caches 310 and response 342 to the processing core 210A. In alternative implementations, the function and its parameters are returned to the host processing core 210A, which calculates the function result.

Given an example set of data elements data1={0, 1, 4, 9, 16 . . . }, a function $f(x)=x^2$ is used to represent the values in data1. For a particular data element in data1, the input x is the index of the data element in the data1 array. When the processing core 210A requests one of the values in data1, the index is used as an input to calculate the requested value using the function $f(x)$. Given an example set of data elements data2={0, 108, 4, 21, 16 . . . }, the values in data2 are represented by the same function $f(x)=x^2$, but with miss indices of {1, 3, . . . }. Since the index '3' is included in the miss indices, a request to access the value data2 [3] will result in a miss in the DaC cache 320. Accordingly, the requested value '21' is retrieved from the backing memory 330 instead of being calculated by the function $f(x)$.

The reconstruction of data in the DaC cache 320 reduces the number of memory requests that are sent to the remote memory 330. As an example, the processing core 210A requests 4 kilobytes of data to be read from the backing memory 330. The data being read is checked in the DaC cache 320. If the function representing the requested data in the DaC cache 320 can accurately reconstruct 25% of the requested data, according to the miss indices or miss vector, then the amount of data to be read from the backing memory 330 is reduced to 3 kilobytes. The remaining 1 kilobyte is computed in functional units 324 of the DaC cache 320 using the function. When the input to the function is available at the start of the transaction (e.g., the input is based on the array index), the function result can be computed in parallel with the remote memory access; thus, the function result can be calculated before the remote memory access completes so that the computation latency is completely hidden. The hit latency for the DaC cache 320 is determined by the latency for reconstructing the data by computing the function result, which is less than the memory access latency for retrieving the data from the backing memory 330. The latency for the function computation depends on the complexity of the function derived for representing the data, with simpler functions resulting in lower latency. Thus, a sufficiently simple function is selected that can be calculated before the remote memory access completes.

In one implementation, the DaC cache 320 includes function deduction logic circuitry 322 that performs curve fitting computations for determining a function for representing the set of data elements. The function deduction logic 322 determines the function type and the parameters defining the function, the miss indices, and other metadata stored in memory 323. In one implementation, the function deduction logic 322 uses single pass curve-fitting techniques to determine a function for representing a set of data elements during initialization of the data elements, or when the data elements are first read. The function deduction logic 322 also uses multi-pass curve-fitting techniques that deduce the function after repeated reads and loads of the data elements (e.g., multiple epochs during machine learning training). In alternative implementations, the function, miss indices, and metadata are calculated outside the DaC cache 320 (e.g., in software executed by the processing core 210A, in network interface hardware, in a processing in memory (PIM) element 331 of the remote memory 330, etc.) and are transmitted to the data reconstruction logic 321 before the data is reconstructed.

In one implementation, miss indices are used as a measure of the applicability of a given curve fitting technique for a particular dataset. In one such implementation, multiple machine learning fitting techniques are tried in parallel, and function deduction logic 322 chooses the technique resulting in the least misses to represent the dataset in the DaC cache 320.

In addition, if the ratio of misses to hits as indicated in the miss indices exceeds a configurable threshold (e.g., greater than a 2:1 ratio of misses to hits), the function deduction logic 322 does not record a function for representing the data. This can happen when the curve fitting technique used cannot match the data within the predetermined tolerance (e.g., when the data is random).

In one implementation, curve fitting techniques are used to derive functions for representing sign and exponent values of floating point data. Because the randomness of mantissa bits is typically much more than that of sign and exponent bits, it may be computationally expensive to find a function to represent the mantissa or to reconstruct the data due to the complexity of the function. In one implementation, mantissa bits are stored explicitly in the DaC cache 320 while sign and exponent bits are represented by a function $f(x)$. For data types such as 16-bit floating point numbers (in which sign and exponent bits represent 37.5% of the data value), this implementation can save memory capacity in the DaC cache 320.

When the processing core 210A stores or modifies a data element within one of the tracked memory regions, the index for the stored or modified value is added to the list of miss indices, so that the function will not be used to reconstruct the data element in response to future requests. Since the data element has been modified after the curve fitting process was performed, it is unknown whether the function can reconstruct the data element within the predetermined tolerance. Subsequent requests for the data element are serviced from the backing memory 330 or other devices (e.g., other caches) in the memory hierarchy. If data elements in a tracked memory region are significantly modified (e.g., more than a threshold proportion of the data elements in the region have been modified since the curve fitting was performed), then the region is removed from the cache. The region is removed from the cache by marking its entry (containing the function, miss indices, and metadata) as invalid. Alternatively, significant modification of the data elements in a region may trigger the curve fitting process to be performed again, or another recalibration process in which the function type and/or parameters are updated to fit the modified data.

In one implementation, the functions of the DaC cache 320 are implemented in software (e.g., as a library) instead of hardware. In a software implementation, the function representing a set of data elements is deduced by the processing core 210A during data preparation, before the data is sent to the remote backing memory 330 for storage. The function, miss indices, and metadata information are stored in the memory hierarchy like other data used by the application.

For hardware or software implementations, even if the curve fitting process of the DaC cache 320 fits relatively simple functions (e.g., quadratic polynomial, n-parameter neural network (NN), etc.) to data, deducing such functions incurs computational overhead. If the function deduction is performed in hardware (e.g., in a network interface) the curve fitting computations can be performed when network packets are being created and processed without blocking the primary processing core 210A from making progress. Offloading the function deduction and curve fitting computations to another processing element in the system thus avoids the overhead from function deduction being placed in the critical path of an application.

The curve fitting process in different implementations can be performed either online (while the data is actively being used or available for use in computations) or offline (while the data is not being used) depending on constraints and the use-case. Read-only (e.g., image/video classification or segmentation, graph input for traversal) or read-mostly (analysis of security data that is periodically updated) workloads are fit to functions offline or during data initialization. Curve fitting for frequently updated data is performed periodically online. The accuracy and computational overhead of curve fitting depends on multiple factors, such as the degree of correlation between the function input and the data elements, the number of data elements (window-size) over which a curve is fit and the curve-fitting technique (polynomial, NN, other ML techniques) used to derive the function $f(x)$.

There are wide variety of curve-fitting techniques (e.g. polynomial, neural network, or other machine learning techniques), each providing a different trade-off between accuracy and computational overhead. Each technique also further has parameters (e.g. layer count, learning rate, etc. for NN techniques) which can be tuned to achieve different results. The choice of curve-fitting technique also determines the number of passes over the data that are used to obtain the representative curve. For example, polynomial curve-fitting techniques are performed with a single pass while NN techniques are performed with multiple passes.

In one implementation, the curve fitting is performed using a polynomial curve fitting technique based on the Hough transform, which is a feature extraction technique used in image analysis, computer vision, and digital image processing, to fit a function over large datasets with array index-based input. This technique enables both accurate and approximate curve-fitting on datasets (treated as a large array) with low overhead.

As previously mentioned, the load address or array index of a data element is readily available at the time of the request, and thus allows the computation of $f(x)$ to begin as soon as the load instruction is issued to the core. However, the load address or array index does not always have a sufficiently high correlation with their corresponding data values. In one implementation, an input derived from the array index using the rank( ) function is used to achieve a better fit with the data elements. For a given index idx, the function input is equal to rank(miss_vector, idx)−1. In the miss vector miss_vector, a bit set to 1 indicates that the corresponding data element can be accurately reconstructed within the predetermined error tolerance using the function, whereas a bit set to 0 indicates that the data element cannot be accurately reconstructed within the error tolerance. The rank function returns the number of elements in the miss vector miss_vector that are equal to '1' from position 0 up to position idx.

Figure 4:
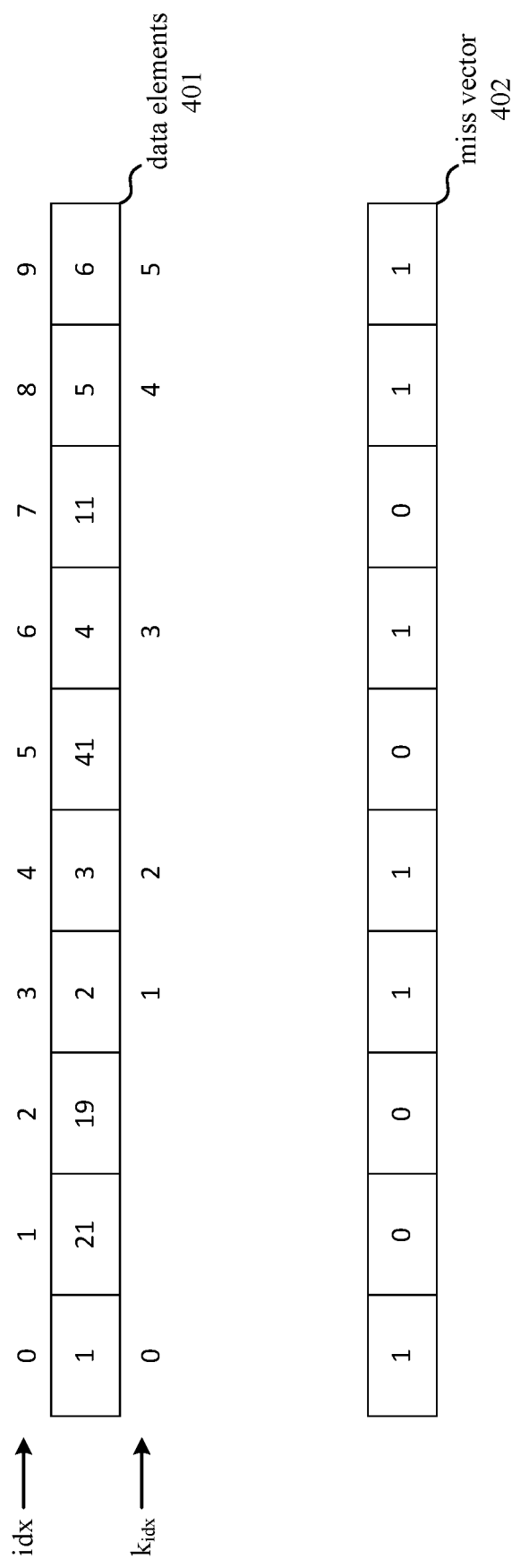
FIG. 4 illustrates data elements and a miss vector, according to an implementation.

FIG. 4 illustrates an array of data elements 401 and a miss vector 402 associated with the data elements 401, according to an implementation. The data elements array 401 includes elements {1, 21, 19, 2, 3, 41, 4, 11, 5, 6}, and is associated with a miss vector={1, 0, 0, 1, 1, 0, 1, 0, 1, 1}. For values of index idx where a hit is indicated by the miss vector 402, the value of the data element data[idx]=$f(k_{idx})=k_{idx}+1$, where $k_{idx}$=rank(miss_vector, idx)−1.

Figure 5:
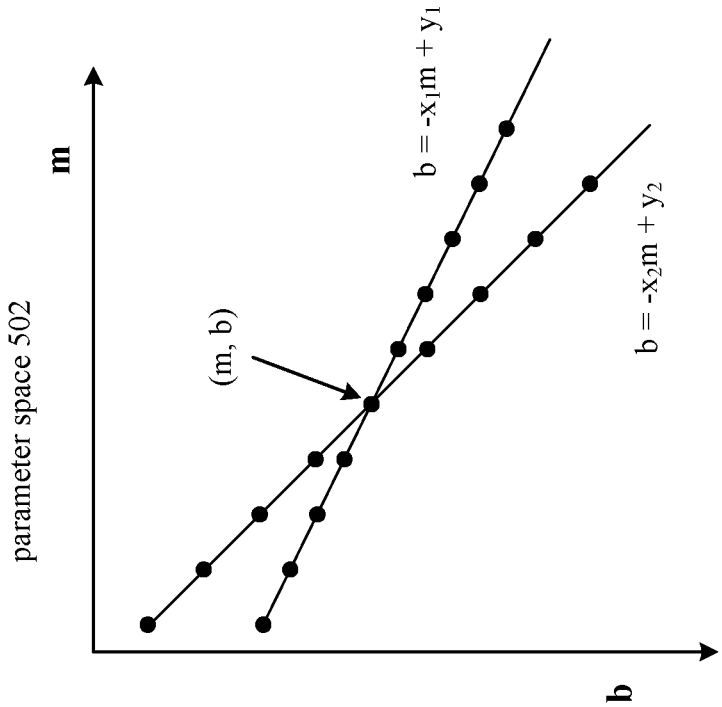
FIG. 5 illustrates a curve fitting process via a Hough transform, according to an implementation.
Figure 5:
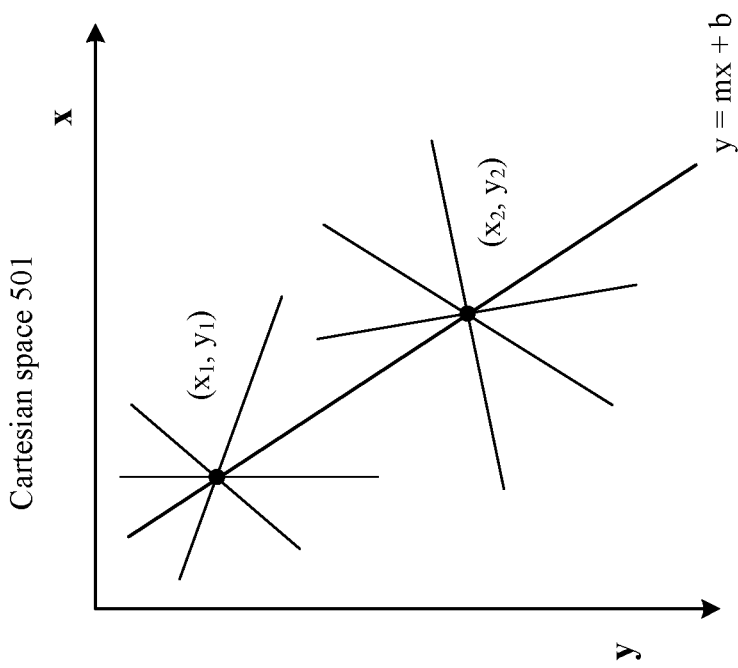

FIG. 5 illustrates the use of a Hough transform to determine a line defined by the function y=mx+b that pass through two points $(x_1, y_1)$ and $(x_2, y_2)$. The points $(x_1, y_1)$ and $(x_2, y_2)$ are shown in Cartesian space 501 and are transformed to parameter space 502 with axes m and b for defining the linear curve y=mx+b. Each point (x, y) in Cartesian space 501 transforms into a line in parameter space 502. Thus, the points $(x_1, y_1)$ and $(x_2, y_2)$ transform into the lines $b=-x_1m+y_1$ and $b=-x_2m+y_2$, respectively, in parameter space 502. The point at which these lines intersect provides the parameter of the line which passes through the points $(x_1, y_1)$ and $(x_2, y_2)$ in Cartesian space.

The Hough transform fitting process is performed by scanning over a finite range of values of m and b to determine whether a given point (x, y) lies on the line y=mx+b, and uses a voting technique to find the values of m and b defining a line that passes through the maximum number of points. Pseudocode for this process is shown below in Table 1.

TABLE 1

Hough transform fitting pseudocode

| | |
|---|---|
| 1 | for (x, y) in Points: |
| 2 | for m in M: |
| 3 | b = y − m*x |
| 4 | if b in B: |
| 5 | Accum[m][b]++ |

In Table 1, Points is the set of all points (x, y) being fitted, M is the set of all m values being tested and B is the set of all b values being tested. An accumulator matrix Accum[m][b] is used to determine the degree of correlation between each candidate function (represented by a unique combination of parameters m and b) and the data elements. The element in the accumulator matrix Accum[m][b] having the highest count represents the line which passes over the most points in Points, and which is therefore the most highly correlated with the set of data elements. For example, given M={0, 1, 2, 3}, B={0, 1, 2, 3}, and Points=(0, 3), (1,3), (2,5), (3,7), (4,7), (5,11), FIG. 6 illustrates the accumulator matrix Accum[m][b] after the voting portion of the Hough transform process is performed, according to an implementation. The different combinations of m and b represented in Accum[m][b] represent the set of candidate functions from which the best fitting candidate function will be selected to represent the data. As shown in FIG. 6, element Accum[2][1] has the highest value of '4', indicating that the line y=2x+1 crosses the most points in Points. This means that given the input value idx, the line y=2x+1 generates a function result that is equal to the data element corresponding to idx in more instances than the other candidate functions. The line y=2x+1 is therefore selected as the best fitting function for representing the data elements in the DaC cache 320.

Table 2 shows pseudocode for a modified Hough transform fitting process which fits a curve over N data points, according to an implementation.

TABLE 2

Modified Hough transform fitting pseudocode

| | |
|---|---|
| 1 | for i in {0,1 .. N−1}: |
| 2 | y = data[i] |
| 3 | for j in LastIndex: |
| 4 | for m in M: |
| 5 | for b in B: |
| 6 | if (abs(y − (m×j + b)) <= abs(Err×y)): |
| 7 | // track original index for miss vector |
| 8 | Accum[m][b].append(i) |
| 9 | updateLastIndex(Accum[m][b].size( )) |

In Table 2, the pseudocode iterates through each of the N data points (per line 1) and, for each data point (having index i and value y), iterates through each value of m and b in M and B, respectively, where M and B are the sets of possible m and b values being evaluated. Accum[m][b] is the accumulator matrix. Each element of the Accum[m][b] matrix is a vector holding the array index of the value being fit. LastIndex is an array containing the current sizes of each vector within Accum[m][b]. Err is the user determined error tolerance (as a fraction) for the curve fitting. The candidate function is considered capable of reconstructing the data if the function result differs from the data element by less than this predetermined tolerance, as shown in line 6 of Table 2.

After the curve fitting process is complete, the entry in Accum[m][b] which holds the longest array indicates the curve which covers the most points. The modified Hough transform fitting process thus identifies a linear sequence of data points which are not necessarily adjacent while maintaining their relative order. The curve covering the most points has the highest degree of correlation with the dataset and is selected as the function for representing the data elements in the DaC cache 320.

As an example, given points (0,1), (1, 21), (2, 19), (3, 2), (4, 3), (5, 41), (6, 4), (7, 11), (8, 5), (9, 6), the entry in Accum[1][1] (corresponding to $f(x)=x+1$) fits on point (0,1) with an input of x=0 (corresponding to j in the Table 2 pseudocode). In addition, this line $f(x)=x+1$ also fits on point (3,2) with x=1; point (4,3) with x=2; point (6,4) with x=3; point (8,5) with x=4; and point (9,6) with x=5. A miss vector is generated by, for each data element, asserting a corresponding miss bit value when the corresponding function result differs from the data element by less than the predetermined tolerance. Accordingly, the miss vector miss_vector is {1, 0, 0, 1, 1, 0, 1, 0, 1, 1} for the above dataset, with the '1' values corresponding to the points lying on the line $f(x)=x+1$ (within the tolerance defined by Err), and '0' values corresponding to the points not on the line. Each of the inputs for x listed above are equal to rank(miss_vector, idx)−1. The top K accumulator entries in Accum[m][b] are selected to get the top K curves which fit the largest number of points within the specified tolerance.

A key step in the Hough transform curve fitting process is determining the sets M and B to evaluate. Larger sets allow for more accurate curve fitting, but increase the computation overhead. In one implementation, an adaptive Hough transform starts with a coarser range of values for m and recursively narrows down the possible values of m.

The prior examples show the use of the Hough transform to fit curves over integer data, which allows m and b to be integers, thus reducing the span of possible values to evaluate. For floating point data, the floating values are split into mantissa and exponent values. Two functions are fit for each floating value, including one for each of the mantissa and exponent components. The actual coverage is the intersection of both functions; that is, the floating point data element is generated by the DaC technique if both the mantissa and the exponent can be computed from their respective functions. Accordingly, the miss indices or miss vector indicate a hit for a floating point data element when both of its mantissa and exponent values can be computed by their respective functions within their respective error tolerances.

Figure 7:
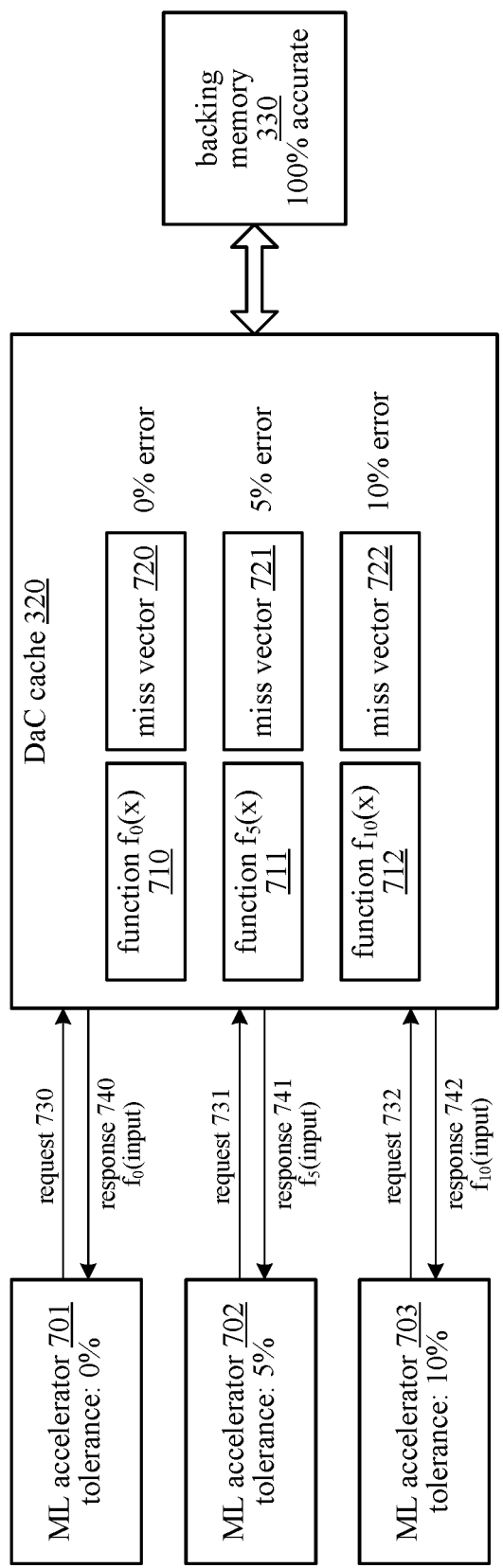
FIG. 7 illustrates a DaC cache representing data at different error tolerances, according to an implementation.

FIG. 7 illustrates an implementation of a DaC cache 320 that represents a set of data elements using multiple functions 710-712 at different tolerances. Some applications are tolerant of error in their working datasets. For example, machine learning tasks can tolerate some error in their training data, with different models tolerating different amounts of error. Accordingly, one implementation of the DaC cache 320 fits multiple curves for the same memory region, with different error tolerances for each curve. The hit rate thus varies depending on which curve is used to reconstruct the requested data. Approximately fitted curves (i.e., with higher error tolerance) achieve higher hit rates than more accurately fit curves. Machine learning models and accelerators that are tolerant of errors can achieve higher memory performance by requesting data elements from the DaC cache 320 using more approximately fit curves having higher hit rates. Models that are less tolerant of error can still request the same data with higher accuracy using the more accurately fit curves.

As shown in FIG. 7, a memory region containing a set of data elements stored in the backing memory 330 is tracked by the DaC cache 320. The memory region is associated with three functions: $f_0(x)$ 710, $f_5(x)$ 711, and $f_{10}(x)$ 712, each representing the data elements within respective errors tolerances of 0%, 5%, and 10%. The DaC cache 320 also stores a respective miss vector 720-722 for each of the functions 710-712. Three different accelerators 701-703 (or three different machine learning or artificial intelligence models) can tolerate 0%, 5% and 10% error in data. The DaC 320 provides data requested by the different accelerators 701-703 by evaluating the function $f_0(x)$, $f_5(x)$, or $f_{10}(x)$ that accommodates the error tolerance of the requesting accelerator 701-703. Compared to accelerator 701, accelerator 703 benefits from higher memory performance since the DaC 320 trades data accuracy for a higher hit rate. The original copy of data in the backing memory 330 remains unmodified (i.e., without lossy compression or other inaccuracies) so that the dataset can be used by other devices.

Figure 8:
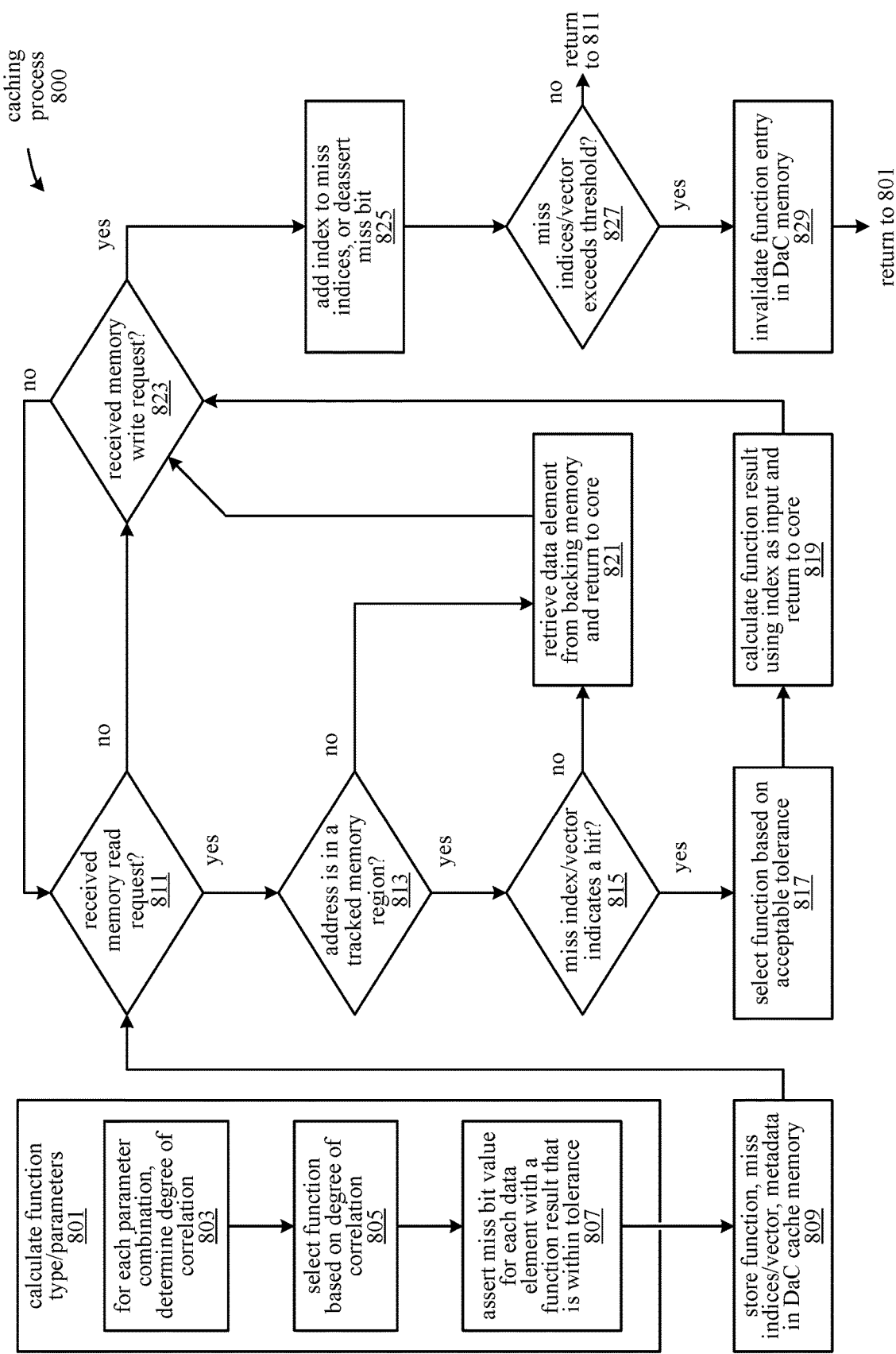
FIG. 8 illustrates a process for caching data in a DaC cache, according to an implementation.

FIG. 8 illustrates a process 800 for caching data in a DaC cache 320, according to an implementation. The process 800 is performed by hardware and/or firmware components of the computing system 100, or by software executing in the system 100, or a combination of hardware and software.

The process 800 begins at block 801, in which a curve fitting process is used to determine a function type and function parameters for representing a set of data elements stored in the remote backing memory 330. Blocks 801-809 are performed by the function deduction logic 322 or in software executed in processing unit(s) 104 and represent operations for determining the function (i.e., function type and parameters), miss vector or miss indices, and other metadata for representing the data. At sub-block 803 of block 801, the function deduction logic 322 scans multiple combinations of parameters, each representing a different candidate function (e.g., different combinations of m and b parameters of a line function) and, for each candidate function, determines a degree of correlation between the function and the dataset. For each parameter combination, the function deduction logic 322 determines the degree of correlation for the candidate function by, for each data element in the dataset, determining whether the candidate function produces a function result that differs from the data element by less than the predetermined error tolerance. In one implementation, the index of the data element or a value derived from the index is used as an input to the candidate function. A higher number of function results that are within the error tolerance from the data element value means that the candidate function is more highly correlated with the dataset.

At sub-block 805, the function deduction logic 322 selects the function having the highest degree of correlation with the data set to represent the data. In one implementation, the function is selected in response to determining that the number of its function results that are within a predetermined error tolerance of a corresponding data element in the dataset exceeds a predetermined threshold. Thus, if the function with the highest degree of correlation does not provide a sufficiently high hit rate, then the region is not represented with a function. In some implementations, the function deduction logic 322 is capable of fitting the data to different types of functions, or using different curve-fitting techniques (e.g., polynomial curve fitting, machine learning techniques, etc.), and performs the curve fitting in parallel using different techniques and function types to determine a function type and parameters resulting in the highest degree of correlation with the dataset values.

At sub-block 807, a miss vector for the function is generated by asserting a miss bit value in the miss vector for each data element that can be reconstructed by the function within the error tolerance (i.e., the function result corresponding to the data element does not differ from the data element by more than the predetermined error tolerance). Alternatively, an index of the data element is added to a list of miss indices if its corresponding function result differs from the data element by more than the predetermined error tolerance.

At block 809, the function deduction logic 322 stores in the memory 323 of the DaC cache 320 the selected function, parameters, miss vector or miss indices, and metadata indicating the memory range of the backing memory 330 that contains the data elements. In one implementation, blocks 801-809 are performed for each of multiple datasets in different regions of the backing memory 330, and/or multiple times for the same dataset (e.g., to represent the same data with multiple functions at different error tolerance levels).

At this point, the DaC cache 320 is ready to process memory requests issued from the processing core 210A that are directed to the set of data elements. The processing core 210A issues a memory request 341 to the memory hierarchy and it is received as request 351 at the DaC cache 320. The request 351 is processed according to blocks 811-821, in which blocks 811-819 are performed by the data reconstruction logic 321 in the DaC cache 320. At block 811, if the memory request 351 is a read request, then the process 800 continues at block 813. At block 813, the address of the request is checked against the metadata in the DaC cache memory 323 to determine whether the address is within a tracked memory region (i.e., within an address range associated with one or more of the functions). If the requested address is in one of the tracked memory regions, the process 800 continues at block 815.

At block 815, the miss vector is checked to determine whether the function (or functions) associated with the tracked memory region containing the requested address will be used to reconstruct the data element. In the miss vector, a miss bit having the same array index or memory address offset as the data element is asserted if the data element can be reconstructed by the associated function. If the miss bit corresponding to the data element is asserted, then the process 800 continues from block 815 to block 817. In an implementation that uses a list of miss indices instead of a miss vector, the index of the requested data element is looked up in the list of miss indices. If the index is not in the list of miss indices, then the associated function is able to reconstruct the data element within the predetermined error tolerance, and the process 800 continues at block 817.

At block 817, if multiple functions are used to represent the data at different tolerance levels (e.g., functions 710-712 as illustrated in FIG. 7), then one of these functions is selected based on the acceptable tolerance level of the requesting application or device. For example, if the data element is requested by the accelerator 702, which can tolerate 5% error, then function 711 is selected for reconstructing the data element. When there is only one function, then that function is selected by default.

At block 819, the data reconstruction logic 321 uses the selected function to calculate a function result representing the requested data element. In one implementation, the index of the data element, which identifies the position of the data element in an array, is used as an input to the function. Alternatively, another value, such as an address offset of the data element, a prior data element in the same dataset or array, or other value can be used as the input, as appropriate. The function result is then calculated by applying the input value to an input of one or more of the functional units 324 for executing the function. The latency for calculating the function result is less than the latency for fetching a data element (e.g., any of the data elements in the dataset) from the backing memory 330. The calculated function result is returned (as response 352) to the requesting core 210A via the upper cache hierarchy 310 to satisfy the request 341. From block 819, the process 800 continues at block 823.

The processing core 210A issues a second memory read request 351 and, at block 823, the DaC cache 320 determines whether the request 351 is a write request. Since the request 351 is not a write request, the process 800 returns to block 811. From block 811, the process 800 continues at block 813, since this second request 351 is a read request. At block 813, if the address of the request 351 is not in a tracked memory region or, at block 815, if the miss index or miss vector indicates that the requested data element is a miss in the DaC cache 320, then the process 800 continues from block 813 or 815 to block 821. At block 821, the data element is fetched from the backing memory 330 instead of being reconstructed by the function, and the data value is returned to the requesting processing core 210A. From block 821, the process 800 continues at block 823.

The process 800 arrives at block 823 from block 821 or from block 811, if a received memory request is not a read request. At block 823, if the memory request is a write request directed to a memory location storing a data element, then the process 800 continues at block 825. At block 825, if the memory location of the request is in a tracked memory region, then the function deduction logic 322 adds the index of the data element being modified to the list of miss indices.

Alternatively, if a miss vector is being used, the function deduction logic 322 deasserts the miss bit corresponding to the data element in the miss vector. If the memory location storing the data element being modified is not in a tracked memory region, then the function deduction logic 322 does not update any miss indices or miss vector. From block 825, the process 800 continues at block 827.

At block 827, if the number of miss indices in the list of miss indices (or the number of deasserted miss bits in a miss vector) does not exceed a threshold, then the process 800 returns to block 811 to continue processing memory read and write requests. At block 827, if the number of miss indices or deasserted miss bits exceeds the threshold, then this indicates a high number of misses relative to hits for the function (i.e., a low hit/miss ratio). In this case, the function is deemed not sufficiently effective at reconstructing the data elements in its associated memory region. Accordingly, the function's entry in the DaC memory 323 is invalidated, as provided at block 829. Thus, the association between the function and the set of data elements is removed so that subsequent requests for the data elements are not fulfilled by reconstructing the requested data using the function. In one implementation, the process 800 returns to block 801 to redo the curve fitting process and find a new function for representing the dataset in the DaC cache 320.

A method includes storing a function representing a set of data elements stored in a backing memory and, in response to a first memory read request for a first data element of the set of data elements, calculating a function result representing the first data element based on the function.

The method further includes calculating a function type of the function and one or more parameters of the function by performing a curve fitting process based on the set of data elements.

The method further includes selecting the function for representing the set of data elements in response to determining that a number of function results of the function that are within a predetermined tolerance of a corresponding data element in the set of data elements exceeds a predetermined threshold.

The method further includes, for each parameter combination of a plurality of parameter combinations, determining a degree of correlation between a candidate function defined according to the parameter combination and the set of data elements by, for each data element in a memory address range containing the set of data elements, determining whether the candidate function produces, based on an index associated with the data element, a function result differing from the data element by less than a predetermined tolerance, selecting a candidate function having a highest degree of correlation as the function representing the set of data elements, and for each data element in the set of data elements, asserting a miss bit when the function result corresponding to the data element differs from the data element by less than a predetermined tolerance.

The method further includes storing metadata associating the function with a memory range of the backing memory, where the set of data elements is stored in the memory range.

In the method, calculating the function result includes applying an index of the first data element to an input of a functional unit for executing the function. The index corresponds to a position of the first data element in an array.

In the method, the function is one of a plurality of functions for representing the set of data elements. Each of the plurality of functions represents the set of data elements within a different tolerance.

The method further includes storing a miss vector including a miss bit for each data element in the set of data elements. Calculating the function result is performed in response to determining that a first miss bit corresponding to the first data element is asserted. The method also includes, in response to a second memory read request for a second data element, fetching the second data element from the backing memory in response to determining that a second miss bit corresponding to the second data element is deasserted. The second data element is stored in a memory location between two data elements of the set of data elements.

The method further includes deasserting the first miss bit in response to a memory write request directed to a memory location storing the first data element, and removing an association between the function and the set of data elements when a number of deasserted miss bits in the miss vector exceeds a threshold.

In the method, a latency for calculating the function result is less than a latency for fetching any one of the set of data elements from the backing memory.

A computing device includes a first memory for storing a function representing a set of data elements stored in a second memory, and data reconstruction logic to, in response to a first memory read request for a first data element of the set of data elements, calculate a function result representing the first data element based on the function.

The computing device further includes function deduction logic coupled with the first memory and for calculating a function type of the function and one or more parameters of the function by performing a curve fitting process based on the set of data elements. The first memory is further configured to store metadata associating the function with a memory range of the second memory. The set of data elements is stored in the memory range.

The computing device further includes function deduction logic coupled with the first memory to, for each parameter combination of a plurality of parameter combinations, determine a degree of correlation between a candidate function defined according to the parameter combination and the set of data elements by, for each data element in a memory address range containing the set of data elements, determining whether the candidate function produces, based on an index associated with the data element, a function result differing from the data element by less than a predetermined tolerance, select a candidate function having a highest degree of correlation as the function representing the set of data elements, and for each data element in the set of data elements, assert a miss bit when the function result corresponding to the data element differs from the data element by less than a predetermined tolerance.

In the computing device, the data reconstruction logic further includes one or more functional units for calculating the function result based on an index of the first data element. The index corresponds to a position of the first data element in an array.

In the computing device, the first memory further stores a miss vector including a miss bit for each data element in the set of data elements. The data reconstruction logic calculates the function result in response to determining that a first miss bit corresponding to the first data element is asserted, and in response to a second memory read request for a second data element, causes the second data element to be fetched from the backing memory in response to determining that a second miss bit corresponding to the second data element is deasserted. The second data element is stored in a memory location between two data elements of the set of data elements.

In the computing device, the first memory is a cache memory, and the second memory is a backing memory having higher access latency than the first memory.

A computing system includes a backing memory for storing a set of data elements, a processing unit coupled with the backing memory for issuing a memory request for a first data element of the set of data elements, and a cache device coupled with the processing unit. The cache device includes a cache memory for storing a function representing the set of data elements, and data reconstruction logic for, in response to the memory request, calculating a function result representing the first data element based on the function.

In the computing system, the cache device further includes function deduction logic coupled with the cache memory for calculating a function type of the function and one or more parameters of the function by performing a curve fitting process based on the set of data elements. The cache memory further stores metadata associating the function with a memory range of the backing memory. The set of data elements is stored in the memory range.

In the computing system, the cache memory further stores a miss vector including a miss bit for each data element in the set of data elements. The data reconstruction logic calculates the function result in response to determining that a first miss bit corresponding to the first data element is asserted. The cache device, in response to a second memory read request for a second data element, causes the second data element to be fetched from the backing memory in response to determining that a second miss bit corresponding to the second data element is deasserted. The second data element is stored in a memory location between two data elements of the set of data elements.

In the computing system, the cache device is a last-level cache in a memory hierarchy of the computing system. The memory hierarchy includes one or more higher-level cache devices between the processing unit and the cache device and the backing memory.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain implementations may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some implementations may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing device 100 and/or portions thereof carried on the computer-readable storage medium may be a database or other data structure which can be read by a program and used, directly or indirectly, to fabricate the hardware including the computing device 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing device 100. The netlist may then be placed and routed to produce a data set describing geometric shapes to be applied to masks. The masks may then be used in various semiconductor fabrication steps to produce a semiconductor circuit or circuits corresponding to the computing device 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another implementation, instructions or sub-operations of distinct operations may be in an intermittent and/or alternating manner.

In the foregoing specification, the implementations have been described with reference to specific exemplary implementations thereof. It will, however, be evident that various modifications and changes may be made thereto without departing from the broader scope of the implementations as set forth in the appended claims. The specification and drawings are, accordingly, to be regarded in an illustrative sense rather than a restrictive sense.

What is claimed is:

1. A method, comprising:
    selecting a function to represent a set of data elements stored in a backing memory based on a number of function results of the function, that are within a predetermined tolerance of a corresponding data element in the set of data elements, exceeding a predetermined threshold;
    storing the function representing the set of data elements stored in the backing memory; and
    in response to a first memory read request for a first data element of the set of data elements, calculating a function result representing the first data element based on the function.

2. The method of claim 1, further comprising:
    calculating a function type of the function and one or more parameters of the function by performing a curve fitting process based on the set of data elements.

3. The method of claim 1, further comprising:
    for each parameter combination of a plurality of parameter combinations, determining a degree of correlation between a candidate function defined according to the parameter combination and the set of data elements by:
        for each data element in a memory address range containing the set of data elements, determining whether the candidate function produces, based on an index associated with the data element, a function result differing from the data element by less than a predetermined tolerance;
    selecting a candidate function having a highest degree of correlation as the function representing the set of data elements; and
    for each data element in the set of data elements, asserting a miss bit when the function result corresponding to the data element differs from the data element by less than a predetermined tolerance.

4. The method of claim 1, further comprising:
    storing metadata associating the function with a memory range of the backing memory, wherein the set of data elements is stored in the memory range.

5. The method of claim 1, wherein:
    calculating the function result comprises applying an index of the first data element to an input of a functional unit for executing the function; and
    the index corresponds to a position of the first data element in an array.

6. The method of claim 1, wherein:
    the function is one of a plurality of functions for representing the set of data elements; and
    each of the plurality of functions represents the set of data elements within a different tolerance.

7. The method of claim 1, further comprising:
    storing a miss vector including a miss bit for each data element in the set of data elements, wherein calculating the function result is performed in response to determining that a first miss bit corresponding to the first data element is asserted; and
    in response to a second memory read request for a second data element, fetching the second data element from the backing memory in response to determining that a second miss bit corresponding to the second data element is deasserted, wherein the second data element is stored in a memory location between two data elements of the set of data elements.

8. The method of claim 7, further comprising:
    deasserting the first miss bit in response to a memory write request directed to a memory location storing the first data element; and
    removing an association between the function and the set of data elements when a number of deasserted miss bits in the miss vector exceeds a threshold.

9. The method of claim 1, wherein:
    a latency for calculating the function result is less than a latency for fetching any one of the set of data elements from the backing memory.

10. A computing device, comprising:
    function deduction logic configured to select a function to represent a set of data elements stored in a first memory based on a number of function results of the function, that are within a predetermined tolerance of a corresponding data element in the set of data elements, exceeding a predetermined threshold;
    a second memory configured to store the function representing the set of data elements stored in the first memory; and
    data reconstruction logic configured to, in response to a first memory read request for a first data element of the set of data elements, calculate a function result representing the first data element based on the function.

11. The computing device of claim 10, wherein the function deduction logic is further configured to calculate a function type of the function and one or more parameters of the function by performing a curve fitting process based on the set of data elements, wherein the second memory is further configured to store metadata associating the function with a memory range of the first memory, wherein the set of data elements is stored in the memory range.

12. The computing device of claim 10, wherein the function deduction logic is further configured to:
for each parameter combination of a plurality of parameter combinations, determine a degree of correlation between a candidate function defined according to the parameter combination and the set of data elements by:
for each data element in a memory address range containing the set of data elements, determining whether the candidate function produces, based on an index associated with the data element, a function result differing from the data element by less than the predetermined tolerance;
select a candidate function having a highest degree of correlation as the function representing the set of data elements; and
for each data element in the set of data elements, assert a miss bit when the function result corresponding to the data element differs from the data element by less than a predetermined tolerance.

13. The computing device of claim 10, wherein:
the data reconstruction logic further comprises one or more functional units configured to calculate the function result based on an index of the first data element; and
the index corresponds to a position of the first data element in an array.

14. The computing device of claim 10, wherein:
the second memory is further configured to store a miss vector including a miss bit for each data element in the set of data elements;
the data reconstruction logic is configured to:
calculate the function result in response to determining that a first miss bit corresponding to the first data element is asserted; and
in response to a second memory read request for a second data element, cause the second data element to be fetched from the first memory in response to determining that a second miss bit corresponding to the second data element is deasserted; and
the second data element is stored in a memory location between two data elements of the set of data elements.

15. The computing device of claim 10, wherein:
the second memory is a cache memory; and
the first memory is a backing memory having higher access latency than the second memory.

16. A computing system, comprising:
a backing memory configured to store a set of data elements;
a processing unit coupled with the backing memory and configured to issue a memory request for a first data element of the set of data elements; and
a cache device coupled with the processing unit, comprising:
a cache memory configured to store a function representing the set of data elements;
data reconstruction logic configured to, in response to the memory request, calculate a function result representing the first data element based on the function; and
function deduction logic configured to select the function to represent the set of data elements based on a number of function results of the function, that are within a predetermined tolerance of a corresponding data element in the set of data elements, exceeding a predetermined threshold.

17. The computing system of claim 16, wherein the function deduction logic is further configured to calculate a function type of the function and one or more parameters of the function by performing a curve fitting process based on the set of data elements, wherein:
the cache memory is further configured to store metadata associating the function with a memory range of the backing memory, and
the set of data elements is stored in the memory range.

18. The computing system of claim 16, wherein the cache memory is further configured to:
store a miss vector including a miss bit for each data element in the set of data elements, wherein the data reconstruction logic is configured to calculate the function result in response to determining that a first miss bit corresponding to the first data element is asserted; and
the cache device is further configured to, in response to a second memory read request for a second data element, cause the second data element to be fetched from the backing memory in response to determining that a second miss bit corresponding to the second data element is deasserted, wherein the second data element is stored in a memory location between two data elements of the set of data elements.

19. The computing system of claim 16, wherein:
the cache device is a last-level cache in a memory hierarchy of the computing system; and
the memory hierarchy includes:
one or more higher-level cache devices between the processing unit and the cache device, and
the backing memory.

20. The computing system of claim 16, wherein the cache memory is further configured to store a miss vector including a miss bit for each data element in the set of data elements, wherein the data reconstruction logic is configured to calculate the function result in response to determining that a first miss bit corresponding to the first data element is asserted.

* * * * *